Patented Jan. 31, 1933

1,895,544

UNITED STATES PATENT OFFICE

ROBERT HALLER, OF RIEHEN, NEAR BASEL, AND ALPHONSE HECKENDORN, OF BASEL, SWITZERLAND, ASSIGNORS TO THE FIRM SOCIETY OF CHEMICAL INDUSTRY IN BASLE, OF BASEL, SWITZERLAND

CELLULOSE DERIVATIVE AND PROCESS OF MAKING SAME

No Drawing. Application filed February 20, 1930, Serial No. 430,122, and in Switzerland June 1, 1929.

The present invention relates to new cellulose derivatives which may form valuable textiles. It comprises the process of making these new products, the new products themselves, and their application in the textile industry. It has been found that cyanogen halides react with cellulose which has previously been treated with alcoholic potassium hydroxide to form new cellulose derivatives which are very probably characterized by the presence of an imido-group and are to be considered as the imido-carbonic acid esters of cellulose having the probable constitution

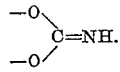

The new products are characterized in that they do not show affinity for the direct dyestuffs, such as for example Direct Sky blue green shade (cf. Colour Index No. 518), but have affinity for acid wool dyestuffs, such as for example Kiton red G (cf. Colour Index No. 31) or tartrazine (cf. Colour Index No. 640). Among the cyanogen halides there come into consideration inter alia cyanogen chloride, cyanogen bromide or cyanogen iodide. The reaction is advantageously carried out in the presence of an indifferent diluent. As such ether, carbon tetrachloride, benzene, toluene, xylene, chlorobenzene, bromobenzene, tetrachlorethane, mixtures of these products, etc. are suitable.

A particular feature of the invention is the treatment of the alkali cellulose, or cellulose treated with alkali, before the action of the cyanogen halide or simultaneously therewith, with carbon bisulfide, whereby similar products are obtained which, as compared with those obtained without the use of carbon bisulfide, may have the advantage that they better retain the structure.

According to the mode of operating, for instance conducting the reaction in presence of an organic base, the new products may have a more or less high content of nitrogen and may have a very soft feel which closely resembles that of sheep's wool.

The following examples illustrate the invention, the parts being by weight:—

Example 1

10 parts of cotton are impregnated in an alcoholic solution of caustic potash of 10 per cent. strength, the excess of the liquor is separated by pressure or centrifuging, and the alkalized material is treated in a solution of 5–10 parts of cyanogen bromide in chlorobenzene at $+10°$ C., advantageously in the presence of anhydrous sodium acetate or the like. As soon as the desired effect is attained the goods are rinsed in hot water and dried. The yarn has a soft feel and great affinity for acid wool dyestuffs and very reduced affinity for direct dyestuffs.

Example 2

10 parts of cotton are impregnated with an alcoholic solution of caustic potash of 10 per cent. strength, pressed or centrifuged and treated for 6–20 hours in a solution of 5–10 parts of cyanogen chloride in 600 parts of xylene in the presence of anhydrous sodium acetate between $0°$ and $10°$ C., and while frequently stirring. The goods are then rinsed in warm water and dried. The fiber has great affinity for acid wool dyestuffs and is at the same time immune to direct and vat dyestuffs.

Example 3

100 parts of cotton are impregnated with an aqueous caustic soda solution of 2 per cent. strength. After separating the excess of liquor by pressing or centrifuging, the material is immersed for 3 hours in carbon bisulfide, then pressed and subsequently treated in the cold in a solution of 30 parts of cyanogen bromide in benzene. The fibers thus treated are characterized by a very soft woolly feel.

What we claim is:—

1. A process for the manufacture of new cellulose derivatives by causing cyanogen halides to act in the presence of indifferent diluents on alkali cellulose obtained by treating cellulose with a solution consisting of potassium hydroxide and alcohol.

2. As new products the celulose derivatives which are obtained by causing cyanogen halides to act in the presence of indifferent diluents on potash cellulose obtained by treating with cellulose a solution containing potassium hydroxide and alcohol, which products contain in their molecule a

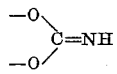

group the two oxygen atoms of which are bound to the cellulose residue, and which products show a strong immunity towards direct dyestuffs and a pronounced affinity for acid dyestuffs.

In witness whereof we have hereunto signed our name this 6th day of February, 1930.

ROBERT HALLER.
ALPHONSE HECKENDORN.